United States Patent [19]
Kinbara

[11] 3,818,356
[45] June 18, 1974

[54] PULSE-SHAPE DISCRIMINATING CIRCUIT, FOR DISCRIMINATING BETWEEN PULSES OF DIFFERING AMPLITUDE AND TIME DURATION

[75] Inventor: Setsuro Kinbara, Ibaragi, Japan
[73] Assignee: Japan Atomic Energy Research Institute, Minato-ku, Tokyo, Japan
[22] Filed: Mar. 23, 1972
[21] Appl. No.: 237,584

Related U.S. Application Data
[63] Continuation of Ser. No. 810,222, March 25, 1969, abandoned.

[30] Foreign Application Priority Data
May 10, 1968 Japan.............................. 43-30843

[52] U.S. Cl................. 328/112, 307/234, 307/235, 328/117
[51] Int. Cl. ............................................ H03k 5/20
[58] Field of Search............ 328/111, 112, 115–117, 328/147; 307/235

[56] References Cited
UNITED STATES PATENTS
| | | | |
|---|---|---|---|
| 3,011,128 | 11/1961 | Filipowsky | 328/117 |
| 3,076,145 | 1/1963 | Copeland | 328/117 |
| 3,130,371 | 4/1964 | Copeland | 328/117 |
| 3,319,170 | 5/1967 | Harmer | 328/117 X |
| 3,473,114 | 10/1969 | Houck et al. | 328/112 |
| 3,513,400 | 5/1970 | Russell | 328/147 |

Primary Examiner—Stanley D. Miller, Jr.
Attorney, Agent, or Firm—Kurt Kelman

[57] ABSTRACT

An output pulse derived from a radiation detector is supplied simultaneously to two characteristic circuits, one of which is substantially a delay characteristic circuit and the other is substantially an integration or a stretch characteristic circuit. The outputs of these circuits are supplied to an amplitude discriminator in which the width of the output pulse is determined by detecting two intersecting phases of the output waveform of the delay characteristic circuit with the output waveform of the expansion circuit. Further, if either of the outputs of these circuits is inverted in polarity by a polarity inverter and the inverted output and the other output are added in a suitable means connected between the output terminals of the other circuit and the inverter, an improved pulse-shape discrimination can be performed by the discriminator by amplitude-discriminating said added output with a reference voltage which is selected as equal to a D.C. output voltage of said means at the normal state thereof.

3 Claims, 11 Drawing Figures

INVENTOR
SETSURO KINBARA
BY
AGENT

PULSE-SHAPE DISCRIMINATING CIRCUIT, FOR DISCRIMINATING BETWEEN PULSES OF DIFFERING AMPLITUDE AND TIME DURATION

This is a continuation of application Ser. No. 810,222, filed Mar. 25, 1969, now abandoned.

BACKGROUND OF THE INVENTION

The present invention relates to a waveform discriminator circuit and, particularly, to a waveform discriminator circuit adapted to be used in a radiation measurement.

In the measurement of radiation, it is known that an output pulse derived from a radiation detector such as scintillation counter, proportional counter or semiconductor detector is different in waveform depending upon a radiation particle falling in the detector, characteristics of the detector and a geometric position of the detector relative to a radiation source. Further, in a scintillation counter, a proportional counter or a semiconductor detector, an output waveform from any of them is also affected by a material of sensing part, a structural feature, a size and a using method of the detector. If an organic scintillation counter is used as a detector to measure a γ-ray and a neutron beam, current pulse waveforms of the detector outputs may become different from each other and the waveform resulted from the neutron beam will be generally broader than that from the γ-ray (FIG. 1).

Alternatively, when a proportional counter whose output waveform is varied considerably with change of the ambient space condition, through which a radiation beam travels, is used for the same purpose, the output current pulse from the detector is integrated generally to convert it to a stepped voltage pulse and shaped by a suitable filter circuit to obtain a pulse having a narrow width. However, although, with such narrow pulse, such waveform difference is somewhat reduced, it cannot be removed completely.

It is also known that such waveform difference can be used to discriminate the respective radiations as well as the respective space conditions by a pulse discrimination technique. Further, with this discrimination method a fine classification of the measuring objects can be possible and the preciseness of the measurement can be improved because each of the respective output pulse widths has an inherent value dependent upon the concerned radiation ray and the interior condition of the detector.

Generally, assuming that two pulse waves are to be discriminated and they are different in waveform at only the falling part thereof, a method for discriminating these pulse waves by the use of the pulse width discrimination technique comprises to provide a certain constant level to these waveforms, to amplitude-discriminate these waves with the constant level and to detect an intersecting point of the level with common raising parts of these pulses and the intersecting points of the level with the respective falling parts (FIG. 2). Thus, two different time durations are obtained and two pulses different in width can be obtained. Since such pulses are logic pulses, they can be treated easily in a time discrimination and/or a pulse width-pulse height conversion technique, etc.

However, this pulse discrimination method may not be applied easily for the radiation measurement purpose because an output pulse height from a radiation detector is widely varied depending upon an energy of incident ray and its action in the detector, etc. That is, if the output pulse height is considerably changed with a change of measurement object while the discrimination level remains at a constant, the relative discrimination condition for each output pulse may be changed and, therefore, a precise discrimination becomes impossible.

To overcome this disadvantage, a combination of very complex and complicated circuit devices for avoiding the pulse height variation has been used. An example of methods using such devices includes to situate a reference phase and another phase for the output pulse, to sample the pulse height at these phases and to convert the sampled height to logarithmic value (FIG. 3). That is, if two output waveforms similar to those described previously are measured with this method, the respective ratios of the heights of these waves at the other phase to the common height at the reference phase can be represented as a height difference therebetween. Such difference can be easily amplitude-discriminated. To increase the sensibility of the discrimination, the difference can be further converted to an inverse logarithmic expression and a resulted voltages proportional to the ratios are amplitude-discriminated. In any way, the discrimination can be performed in this method unrelatedly with the output pulse height variation.

It is clear, however, that such conventional methods have some inherent disadvantages which will make them unsatisfactory to use in the practical measurement for the following reasons:

1. It is very difficult to locate the sampling phase precisely;
2. It requires complex circuit devices to perform the logarithmic and inverse logarithmic conversions. In this connection it is difficult to maintain the specific characteristics of the respective structural components of these devices at constant and reliable states;
3. Any slight change of the location of (1) or (2) may affect considerably to the whole system inversely.

Another example of the conventional methods for the present purpose is to use a conventional pulse width discrimination with amplified and shaped output pulse (FIG. 4). In this method, a current output pulse from a detector is integrated and then shaped by means of a dual delay line so that it is converted to a bipolar pulse. A point of the bipolar pulse intersecting with a base line is detected and a time duration between the point and a standing point of the bipolar pulse is measured as a pulse width. In this method, if another output pulse different in form from the previous pulse is supplied from the detector, the intersecting point will be shifted in either direction of the base line and thus the waveform difference can be detected. In this method, however, it is doubtful that the intersecting point can be considered as a suitable reference of the measurement and so this method is not always suitable. Further the output pulse must be changed to the bipolar pulse.

SUMMARY OF THE INVENTION

The principal object of the present invention is to provide a novel waveform discrimination system applicable to a radiation ray discrimination which has been considered as impossible or very difficult with pulse width discrimination method.

This and other objects of the present invention will be apparent from the following description of preferred forms of the present invention, illustrated with reference to the accompanying drawings.

DETAILED DESCRIPTION OF THE PREFERRED EMBODIMENT

Figure 5:
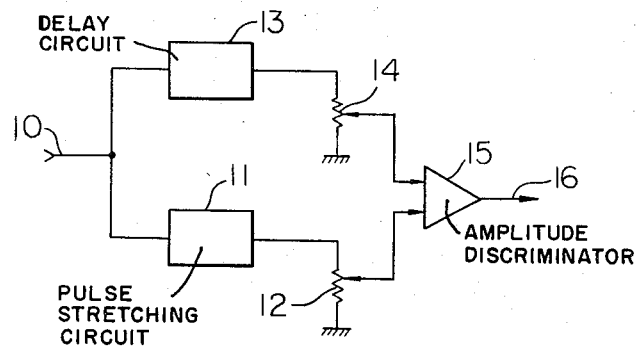
FIG. 5 is a basic block diagram of a preferred discrimination circuit in accordance with the present invention.
Figure 6:
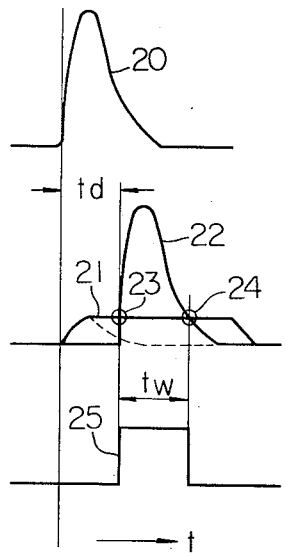
FIG. 6 explains the operation of the discrimination circuit in FIG. 5.

Returning now to the drawings, FIGS. 1 through 4 are already explained. FIG. 5 is a block diagram of the present invention and the operational waveforms appearing in the block diagram are shown in FIG. 6. Input pulse 20 is supplied to input terminal 21. The pulse is fed to both characteristic circuit 11 and 13. The output voltage of circuit 11 is suitably divided by variable resistor 12 and a fraction of the output voltage is supplied to amplitude discrimination 15. The term "characteristic circuit" used herein is referred as a circuit having one or more specific characteristics and characteristic circuit 11 is assumed to have a stretch characteristic, an integration characteristic or either of these characteristics with a differentiation characteristic. As an example, it is assumed that circuit 11 has a stretch characteristic only. On the other hand, characteristic circuit 13 is constructed with a circuit having a delay characteristic or an integration characteristic and it is also assumed for clarification of explanation that circuit 13 has a delay characteristic whose delay time is td.

The output waveforms from the respective circuits 11 and 13 will become to those depicted by numerals 21 and 22 respectively. The amplitude of waveform 21 will be proportioned to the peak value of pulse 20 at input 10 of the present circuit in FIG. 5 and its waveform is the same as that of pulse 20 while the phase of wave 21 is shifted by time $td$ from that of pulse 20. After the reference levels of these waves are equalized, they are supplied to amplitude discriminator 15 and discriminated therein. Discriminator 15 is operated at points 23 and 24 which are the intersecting points of wave 21 with wave 22 and at which these waves have the same values. Thus, the duration tw between points 23 and 24 corresponds to the pulse width of wave 21.

As above mentioned, since wave 22 is just wave 20 delayed by time td and the value of wave 21 is proportioned to the peak value of wave 20, the relation between points 23 and 24 does not change with the height variation of pulse 20 and thus the pulse width can be detected precisely regardless the height variation of pulse 20. In FIG. 6, the discrimination level is selected at about 20 percent of the peak value of wave 20. However, it should be noted that by regulating the amplitudes of waves 21 and 22 and by properly selecting the ratio between the amplitudes, the discrimination level can be located at any level arbitrarily. Output pulse 25 at output 16 of discriminator 15 is a logic pulse and, therefore, it can be treated easily suitably by a time discrimination or a pulse width-pulse height conversion, etc.

Figure 8:
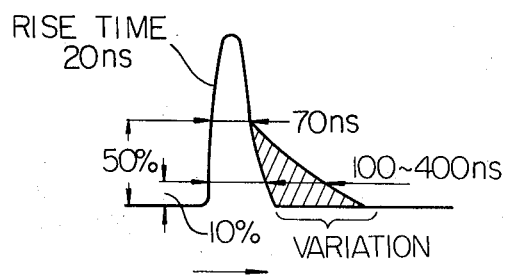
FIG. 8 shows an input pulse waveform to the discrimination circuit in FIG. 7.
Figure 7:
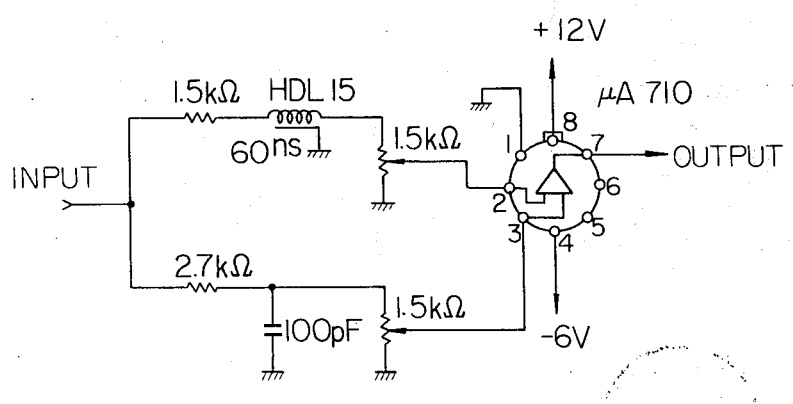
FIG. 7 shows a preferred embodiment of the present discrimination circuit.
Figure 9:
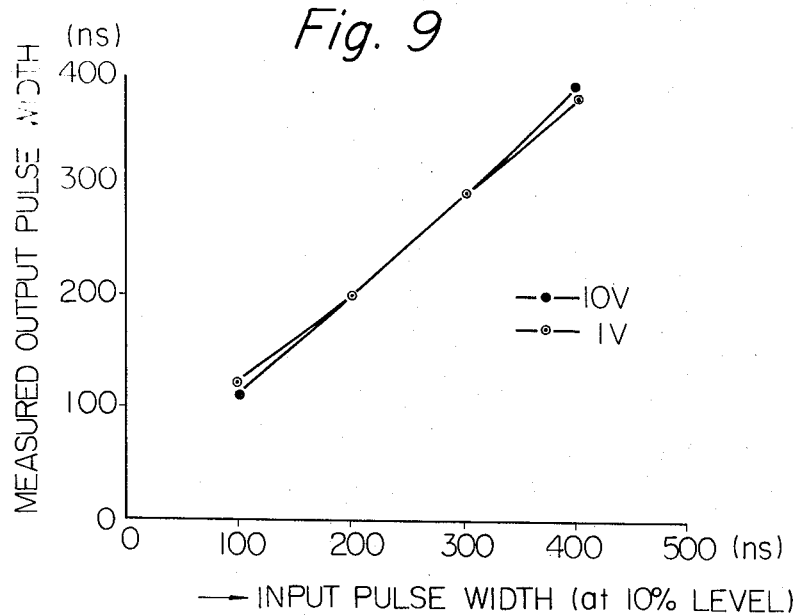
FIG. 9 is a graph of a practical data obtained by the discrimination circuit in FIG. 7.

FIG. 7 shows an embodiment of the present invention, a pulse to be measured in this embodiment is shown in FIG. 8 and a result of the measurement is shown in FIG. 9. The waveform in FIG. 8 is one generated by a pulse generator for the sake of convenience, which is substantially analogous to the output pulse of a scintillation counter when a γ-ray and a neutron beam are detected thereby.

In this embodiment, an integration circuit is used as circuit 11, whose constant is selected as about 100 nanoseconds ($100 \times 10^9$ seconds), and a delay line whose delay time is 60 nanoseconds is used as circuit 13. The discrimination level is selected at about 10 percent of the peak value of the input pulse and the pulse width is detected. FIG. 9 shows the response of the present circuit to the pulses, in which the width of the input pulse is located on the lateral coordinate and the detected width is located on the vertical coordinate in nanosecond. It is clear from FIG. 9 that the detected width is very proximate to the input width.

As said previously, in accordance with the present invention, the discrimination level can be located desirably by treating respective two waveforms to be supplied to the discriminator with the certain characteristic circuits respectively according to a certain measuring object and by selecting suitably the amplitude ratio between these waveforms. Thus, with the present discrimination circuit any pulse can be discriminated with its inherent preciseness and high reliability even though a pulse to be discriminated has only localized difference with respect to others, and its construction is very simple such as shown in FIG. 7. Further, the measuring range of the present circuit can be selected widely and the center of the range can be easily selected at any point arbitrarily.

As described previously, the basic concept of the present invention is the use of parallel two characteristic circuits such as circuits 11 and 13 in FIG. 5 for shaping the two pulses to be supplied to the discriminator. That is, circuit 11 stretches the input pulse in which the value of the stretched pulse is proportioned to the peak value of the input pulse, and circuit 13 shift the input pulse by a certain delay time without any change of its waveform. Thus, by selecting the height ratio of these pulses from these characteristic circuits, an amplitude discrimination can be performed. The characteristics of these circuits are not defined to those described previously as respective examples and, if other characteristics are given to the respective circuits, the discrimination result of the present discrimination circuit will become one affected by those additional characteristics.

Figure 1:
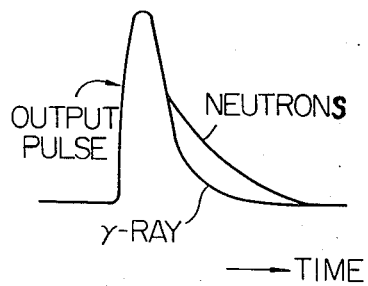
FIG. 1 illustrates an example of waveform difference of output pulses from a radiation detector as already explained.
Figure 2:
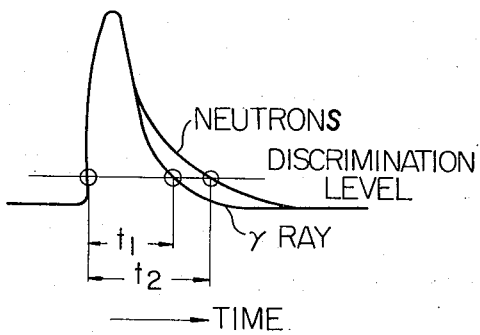
FIG. 2 illustrates a conventional discrimination method for these different waveforms as already explained.
Figure 3:
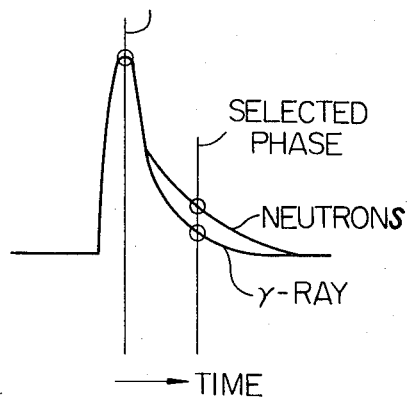
FIG. 3 illustrates another conventional discrimination method as already explained.
Figure 4:
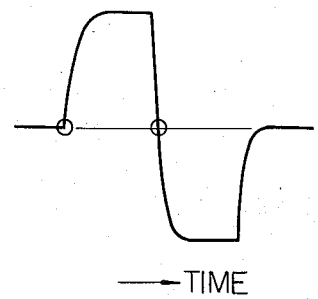
FIG. 4 illustrates a further conventional discrimination method as also explained previously.

For example, when an integration circuit is used as characteristic circuit 11, the intersecting point of the input pulse with the discrimination level at the raising portion of the input pulse in FIG. 2 will be relatively lowered and, if a circuit constituted with an integration circuit and a part of a differentiation circuit is used as circuit 11, the above point will be raised. Further, it should be noted that, instead of a delay line for circuit 13, an integration circuit whose constant is different from that of circuit 11 can be used and, if a delay line combined with an integration circuit or a differentiation circuit is used, a discrimination can be performed with local emphasis or deemphasis causing the discrimination condition to be extended considerably.

As said previously, the present discrimination circuit itself is very simple in construction and reliable and thus it is considered as sufficiently useful in the concerned filed at the present. However, in this discrimination circuit, when it is desired that the amplitude of the input pulse is further increased to increase its sensibility, it may be possible that the amplitude is limited to about 5 volts due to maximum voltage of transistors and/or integrated circuits to be used in the present discrimination circuit and thus the increase of sensibility of the present circuit to the variable input pulse is limited to a certain level. Further, even when the amplitude of the input pulse is selected in a proximity of but within the limitation, the discrimination characteristics of the present circuit may be disturbed by mutual coupling through internal coupling capacitors, etc., in the circuit. In this case, a special consideration of the circuit construction must be provided to operate the present circuit properly regardless the considerable level variation of the input pulse because the intersecting points, that is, the operating time points (points 23 and 24 in FIG. 6) of the discriminator is varied with the amplitude of the input pulse and the D.C. level of the operating point is varied.

Figure 11:
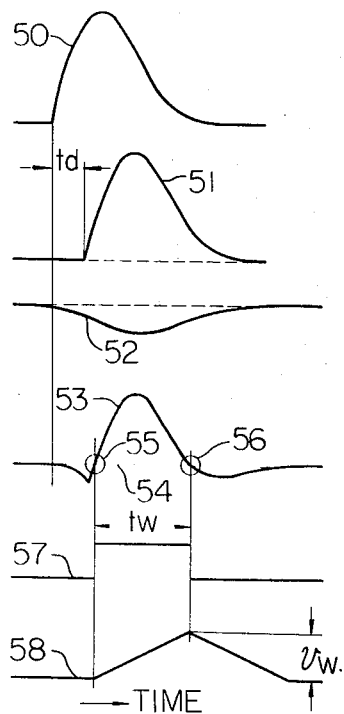
FIG. 11 is waveforms explaining the operation of the embodiment in FIG. 10.
Figure 10:
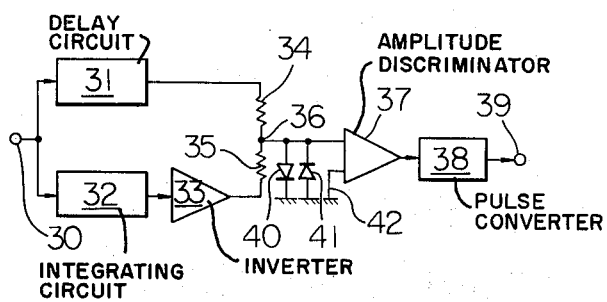
FIG. 10 is a block diagram of another embodiment of the present invention.

An embodiment shown in FIG. 10 whose operating mode is shown in FIG. 11 is a circuit eliminating the above problem due to the large increase of the input pulse height completely without any special consideration. As in the former embodiment, input pulse 50 supplied to input terminal 30 is supplied to both characteristic circuits 31 and 32. Circuit 31 is a delay circuit having a suitable delay time and waveform such as indicated by numeral 51 is produced at its output. On the other hand, a suitable integration circuit having a suitable gain is used as characteristic circuit 32 and the polarity of the output pulse of circuit 32 is inverted by inverter 33, and thus a waveform such as indicated by numeral 52 is obtained at the output of the inverter.

Waveforms 51 and 52 are applied to two series resistors 34 and 35 respectively and a composite output is derived from connection 36 of these resistors. Thus, at point 36, waveform composed with waveforms 51 and 52 is obtained and then it is supplied to amplitude discriminator 37. In discriminator 37, composite waveform 53 is compared with a reference voltage which is selected to be equal to the normal voltage at center 36, such as ground voltage 42 shown in FIG. 10. Since the composite waveform intersects with the reference voltage level 51 at points 55 and 56, output waveform 57 is obtained from the discriminator. If the input waveform is a constant one, each of the intersecting points, such as 55 and 56, will occur at a constant phase regardless its amplitude, because both waveforms 51 and 52 are proportioned to the input pulse. Therefore, the width of pulse 57 become proportional to the width of the input pulse. This pulse width tw can be treated as a logic pulse in any conventional manner. For example, when, by using pulse width-pulse height conversion circuit 38, pulse width tw of wave 57 is converted to waveform 58 whose height $V_w$ is proportioned to width $t_w$, and height $V_w$ can be used to discriminate the input pulse by further treating it in, for example, an additional amplitude discriminator.

According to the amplitude discrimination system of the present invention, various advantages can be provided due to a constant reference or discrimination level at which the amplitude discrimination is performed. First of the advantages is the symplified construction of the amplitude discrimination circuit. For example, although the operation range of amplitude discriminator 37 may be generally very narrow, it is very significant that the degree of freedom for selection of elements to be used in the discriminator is increased, and a relatively low power supply voltage can be used. Secondarily, the sensibility of the discrimination circuit can be increased. That is, if the input signal level is considerably high, a part of the signal amplitude, which is not required for the discrimination, can be limited by a limiter constituted, for example, with diodes 40 and 41 and thus the intersecting portion can be remained as it is at high fidelity. Thirdly, any mutual induction phenomenon between the input pulses can be substantially eliminated. That is, as will be clear from FIG. 10, since the voltage at one input terminal of the amplitude discriminator is fixed at a constant level and thus the impedance of the terminal can be kept at a sufficient low level, any occurrence of the mutual induction can be minimized.

The respective characteristic circuits shown in FIG. 10 may be selected desirably from a group of an integration circuit, a differentiation circuit, an expansion circuit, a delay circuit, an attenuation circuit and a combination circuit of desirable parts of these circuits.

The phase inverter circuit used in connection with either of the characteristic circuits may be any conventional one. It may be substituted, if necessary, for a phase inverter amplifier comprising active elements or a pulse transformer.

Although the output wave height is proportioned to the width of the input pulse in FIG. 10, a number of clock pulses can be converted from the width in such a way that the number of clock pulses is proportioned to the input pulse width.

What is claimed is:

1. A pulse shape discriminating circuit for discriminating between pulses of differing amplitude and time duration, the differences in time duration occurring primarily along the trailing edges of the pulses, comprising: a first characteristic circuit having a first pulse shaping characteristic, a second characteristic circuit having a second pulse shaping characteristic, the input terminal of said first pulse shaping characteristic being coupled to the input terminal of said first characteristic circuit, a polarity inverter circuit having its input terminal connected to either one of the output terminals of said first and second characteristic circuits, means for adding the output signals of said inverter and the other characteristic circuit, and an amplitude discriminator circuit having its input terminals coupled respectively to an output terminal of said means and a fixed reference voltage supply, the reference voltage being equal to a voltage at said output terminal of said means when it is in a normal state whereby, when an input pulse is supplied to both of said first and second characteristic circuits through their respective input terminals, said characteristic circuits produce pulses shaped according to their characteristics respectively, the polarity of either one of said produced pulses being inverted, said inverted pulse and the output signal of the other characteristic circuit being added in said means, the added signal being discriminated with said reference voltage level in said discriminator, the time duration between points which represent said amplitude of said added signal becoming equal to said reference level being measured and said time duration being used to produce a pulse whose height corresponds to said duration or to a plurality of clock pulses whose number is proportional to said duration.

2. A pulse-shape discrimination circuit as set forth in claim 1, wherein said first characteristic circuit is a circuit having a stretch characteristic as its main characteristic and said second characteristic circuit is a circuit having a delay characteristic as its main characteristic.

3. A pulse shape discriminating circuit for discriminating between pulses of differing amplitude and time duration, the differences in time duration occurring primarily along the trailing edges of the pulses, comprising; a first pulse shaping characteristic circuit having an integrating characteristic as its main characteristic, a second pulse shaping characteristic circuit having a delay characteristic as its main characteristic, the input terminal of said first pulse shaping characteristic being coupled to the input terminal of said first characteristic circuit, a polarity inverter circuit having its input terminal connected to either one of the output terminals of said first and second characteristic circuits, means for adding the output signals of said inverter and the other characteristic circuit, and an amplitude discriminator circuit having its input terminals coupled respectively to an output terminal of said means and a fixed reference voltage supply, the reference voltage being equal to a voltage at said output terminal of said means when it is in a normal state whereby, when an input pulse is supplied to both of said first and second characteristic circuits through their respective input terminals, said characteristic circuits produce pulses shaped according to their chaacteristics respectively, the polarity of either one of said produced pulses being inverted, said inverted pulse and the output signal of the other characteristic circuit being added in said means, the added signal being discriminated with said reference voltage level in said discriminator, the time duration between points which represent said amplitude of said added signal becoming equal to said reference level being measured and said time duration being used to produce a pulse whose height corresponds to said duration or to a pulse whose height corresponds to said duration or to a plurality of clock pulses whose number is proportional to said duration.

* * * * *